Feb. 9, 1965

W. A. FRYE 3,168,773

METHOD OF MANUFACTURING A DRIVE ROLLER FOR
A DOMESTIC APPLIANCE

Filed Oct. 30, 1961

INVENTOR.
William A. Frye
BY
Frederick M. Ritchie
His Attorney 3,168,773
METHOD OF MANUFACTURING A DRIVE
ROLLER FOR A DOMESTIC APPLIANCE
William A. Frye, Dayton, Ohio, assignor to General
Motors Corporation, Detroit, Mich., a corporation
of Delaware
Filed Oct. 30, 1961, Ser. No. 148,531
4 Claims. (Cl. 29—148.4)

This invention relates to a domestic appliance and more particularly to an improved method of manufacturing a drive roller for a dry-type agitating and spinning mechanism.

A copending application Serial No. 5,174 filed January 28, 1960, now patent 3,087,321 issued April 30, 1963, and assigned to the same assignee as this invention is directed to an agitating and spinning mechanism for a washing machine wherein exposed resiliently tired rollers are used to transmit motion between a prime mover and the driven mechanism for selectively effecting either agitation or spin. More particularly the rollers are selectively wedged in driving relationship between the drive shaft of a motor and a driven drum. Thus the resilient tires are subjected to severe stresses which impair the fatigue life of the rollers.

Accordingly it is an object of this invention to improve the fatigue life of rollers used for transmitting rotative energy.

Another object of this invention is the provision of compressive stresses throughout the resilient tire of a drive roller.

Still another object of this invention is the provision of a method of bonding a tread or tire on an annular roller insert before the insert is compressed radially to set up compressive stresses in the tire.

Further objects and advantages of the present invention will be apparent from the following description, reference being had to the accompanying drawings wherein a preferred embodiment of the present invention is clearly shown.

Figure 1:
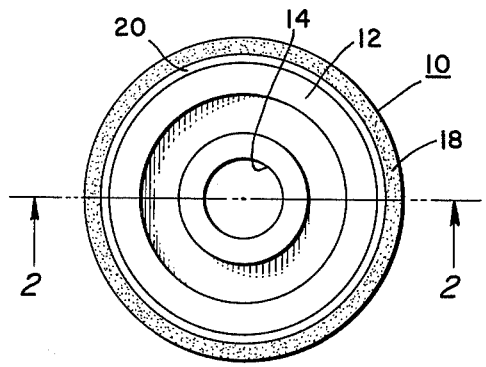
FIGURE 1 is a top elevational view of the drive roller assembly of this invention.
Figure 2:
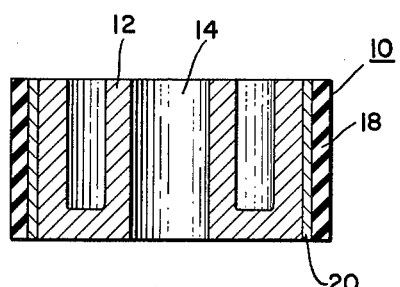
FIGURE 2 is a sectional view of the drive roller assembly taken along line 2—2 of FIGURE 1.

In accordance with this invention with reference to FIGURE 1 a drive roller assembly 10 is illustrated which is suitable for use in an agitating and spinning mechanism such as taught in the copending application Serial No. 5,174 filed January 28, 1960, now patent 3,087,321. The roller 10 is comprised of a wheel or hub portion 12 having a bore 14 for journalling the roller in a motion transmitting relationship in a prime mover system. A tire sub assembly 16 (FIGURES 3 and 4) is comprised of a resilient urethane tire 18 bonded to a cylindrical metal insert 20. This invention pertains to a roller and to a method for making the tire sub assembly therefor.

During operation of the roller 10 in a motion transmitting relationship, the roller tire 18 is wedged between a driver and a driven member. Thus the resilient tire is subjected to severe stresses along its peripheral surface which, over a period of time, produce fatigue in the tire and thereby lessen the life expectancy of the roller. This improvement is directed basically to providing a permanent compressive stress in the tire 18 so that subsequent service stresses of the roller will not produce high tensile stresses in the tire. In the ultimate the tensile stresses may be completely eliminated from the tire. Once compressive stresses are established, the urethane tire or resilient layer is capable of absorbing severe radial loads without suffering fatigue failure. Inasmuch as the resilient layer 18 has been initially and permanently set in compression, the resilient layer is not subjected to an elongating force in its operative relationship but is rather subjected to a varying compressive force. Accordingly the useful operating life of the resilient tire is greatly enhanced.

Figure 3:
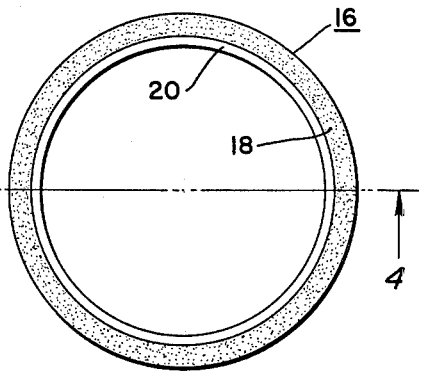
FIGURE 3 is a top elevational view of the tire sub assembly of this invention.
Figure 4:
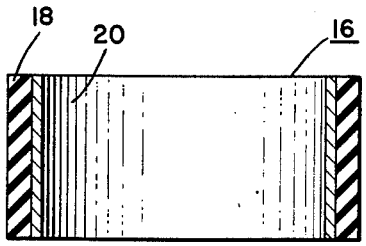
FIGURE 4 is a sectional view of this sub assembly taken along line 4—4 in FIGURE 3.

With reference now to FIGURES 3 and 4 a method for manufacturing the tire sub assembly 16 will be clearly set forth. First a layer of urethane rubber 18 is molded to a thin cylindrical metallic insert 20 and allowed to harden. The molding process provides a bond between the insert 20 and the urethane which is sufficiently strong to cause the urethane to move integrally with the insert 20. For the purposes of this invention it is necessary that the insert 20 be relatively thin so that it may be subjected to a squeezing operation. Next, then, the method includes the step of squeezing the tire sub assembly 16 radially inwardly to cause a permanent set to take place in the thin insert 20. When the radial squeezing load is removed, the urethane tire 18, which adheres firmly to the metal insert 20, will be of lesser circumference and will therefore have compressive stresses in its surface and throughout its cross section. As a last step in the method the compressed and compacted tire sub assembly 16 will then be pressed onto the wheel 12 to complete the roller 10. It should be recognized that the design size of the drive roller for use in a transmission will be that size which results after the tire sub assembly has been squeezed.

Figure 5:
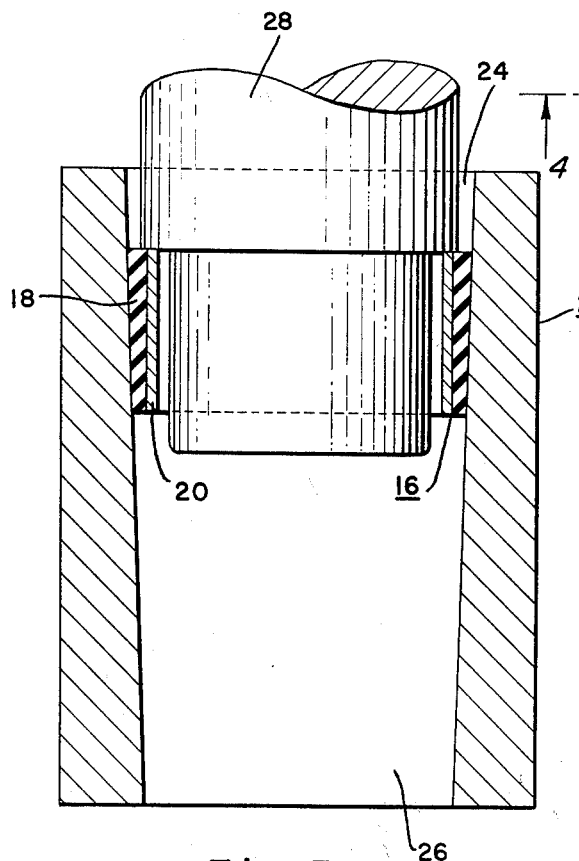
FIGURE 5 is a sectional view, partly in elevation, to illustrate one method of providing compressive stresses in a roller tire in accordance with this invention.

One method of compressing and compacting the tire sub assembly 16 is shown in FIGURE 5 but it should be understood that other methods could be used within the purview of this invention. More particularly the tire sub assembly 16 is placed within a tapered sizing die 22 which has a circular inlet end 24 and a smaller circular outlet end 26 to form a conically shaped passageway within the sizing die. The tire sub assembly 16 is positioned therein and pushed from the large end 24 toward the small end 26 by a mandrel 28. As the sub assembly moves progressively toward the smaller end, the metal insert 20 and the tire 18 will be compressed or squeezed radially inwardly to a smaller circumference and a smaller diameter. Then the entire compressed and compacted sub assembly is ready for attachment in any suitable means to the wheel portion 12.

It should now be seen that an improved motion transmitting roller has been provided having permanent compressive stresses preset into the resilient tire portion of the roller, thereby to improve the fatigue life of the roller during operation.

While the embodiment of the present invention as herein disclosed, constitutes a preferred form, it is to be understood that other forms might be adopted.

What is claimed is as follows:

1. A method of manufacturing a drive roller comprising the sequential steps of forming a thin generally cylindrical metallic insert, molding a resilient urethane tire on the outer peripheral surface of said insert, sizing said drive roller by radially squeezing said insert and said tire in a manner to surpass the elastic limit of said insert and said tire to reduce permanently the diameter of said insert and said tire thereby to set up permanent compressive stresses in the outer surface of said tire, and pressing said reduced diameter insert onto a roller hub.

2. A method of manufacturing a drive roller tire comprising the sequential steps of forming a thin generally annular metallic insert, molding a resilient tire on the outer peripheral surface of said insert, and compressing and compacting said tire by reducing the diameter of said insert a sufficient amount to set up permanent compressive stresses in the outer surface of said tire.

3. A method of manufacturing a drive roller comprising the sequential steps of forming a thin generally cylindrical metallic insert, molding a resilient urethane tire on the outer peripheral surface of said insert, compressing and compacting said tire by reducing the diameter of said insert a sufficient amount to reduce permanently the circumference thereof thereby to set up permanent compressive stresses in the outer surface of said tire, and positioning said reduced circumference insert onto a journalling means.

4. A method of manufacturing a drive roller comprising the sequential steps of forming a thin generally annular malleable insert, molding a resilient tire on the outer peripheral surface of said insert, and compressing and compacting said tire by reducing the circumference of said insert a sufficient amount to set up permanent compressive stresses in the outer surface of said tire.

References Cited in the file of this patent

UNITED STATES PATENTS

| | | |
|---|---|---|
| 1,341,612 | Bolduc | May 25, 1920 |
| 1,665,902 | Bastian | Apr. 10, 1928 |
| 1,934,256 | Bronson | Nov. 7, 1933 |
| 2,647,556 | Courtney | Aug. 4, 1953 |

FOREIGN PATENTS

| | | |
|---|---|---|
| 779,200 | Great Britain | July 17, 1957 |